US009396035B2

(12) United States Patent
Moffitt (10) Patent No.: US 9,396,035 B2
(45) Date of Patent: Jul. 19, 2016

(54) MULTI-DIMENSIONAL COMPUTING AND COMMUNICATION RESOURCE ALLOCATION USING BIN-PACKING WITH PER-BRANCH COMBINATION TRIES

(71) Applicant: INTERNATIONAL BUSINESS MACHINES CORPORATION, Armonk, NY (US)

(72) Inventor: Michael David Moffitt, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 314 days.

(21) Appl. No.: 14/098,960

(22) Filed: Dec. 6, 2013

(65) Prior Publication Data

US 2015/0160978 A1    Jun. 11, 2015

(51) Int. Cl.
*G06F 9/46* (2006.01)
*G06F 9/50* (2006.01)

(52) U.S. Cl.
CPC ............. *G06F 9/5066* (2013.01); *Y02B 60/142* (2013.01); *Y02B 60/167* (2013.01)

(58) Field of Classification Search
None
See application file for complete search history.

(56) References Cited

U.S. PATENT DOCUMENTS

| | | | |
|---|---|---|---|
| 4,495,559 A | 1/1985 | Gelatt, Jr. et al. | |
| 6,035,333 A | 3/2000 | Jeffries et al. | |
| 6,925,061 B2 | 8/2005 | Lee et al. | |
| 6,941,365 B2 | 9/2005 | Sirgany | |
| 7,243,167 B2 | 7/2007 | Zimmer et al. | |
| 7,725,900 B2 | 5/2010 | Sauermann | |
| 8,041,611 B2 | 10/2011 | Kleinrock et al. | |
| 8,255,516 B1 | 8/2012 | Zhang et al. | |
| 8,918,750 B1 | 12/2014 | Moffitt | |
| 2002/0016785 A1 | 2/2002 | Sirgany | |
| 2005/0066108 A1* | 3/2005 | Zimmer | G06F 12/0646 711/1 |
| 2011/0173327 A1 | 7/2011 | Chen et al. | |
| 2013/0042071 A1 | 2/2013 | Chetlur et al. | |

(Continued)

OTHER PUBLICATIONS

Notice of Allowance in U.S. Appl. No. 14/099,021 mailed on Aug. 18, 2014, 13 pages (pp. 1-13 in pdf).

(Continued)

*Primary Examiner* — Wissam Rashid
(74) *Attorney, Agent, or Firm* — Mitch Harris, Atty at Law, LLC; Andrew M. Harris; Steven L. Bennett (57) ABSTRACT

A recursive solution to a bin-packing algorithm provides efficient allocation of computing or communications resources to resource consumers in a computer or network system. The algorithm determines resource requirement vectors for the consumers that specify amounts of multiple resource types required for each consumer, thereby forming a multi-dimensional bin-packing problem. The algorithm assigns the resource consumers to corresponding groups of computing or communication resources by recursively exploring partial solutions that assign the consumers to the groups by extending the partial solutions via recursion until the requirements in the resource requirement vectors are met. The bin-packing algorithm tests resource requirements vectors for remaining unassigned ones of the resource consumers for both assignment and non-assignment to a current individual group of computing or communications resources in a current partial solution until the current partial solution becomes a complete solution that satisfies the requirement vectors for the plurality of resource consumers.

13 Claims, 9 Drawing Sheets

(56) References Cited

U.S. PATENT DOCUMENTS

| | | |
|---|---|---|
| 2013/0173808 A1 | 7/2013 | Yoon et al. |
| 2015/0160979 A1 | 6/2015 | Moffitt |
| 2015/0161317 A1 | 6/2015 | Moffitt |

OTHER PUBLICATIONS

Office Action in U.S. Appl. No. 14/300,688 mailed on Aug. 14, 2014, 11 pages (pp. 1-11 in pdf).

Office Action in U.S. Appl. No. 14/300,688 mailed on May 21, 2015, 5 pages (pp. 1-5 in pdf).

Moffitt, et al., "Optimal Rectangle Packing: A Meta-CSP Approach", 2006, pp. 93-102, American Association for Artificial Intelligence, Dept. of Electrical Engineering and Computer Science, University of Michigan, Ann Arbor, US.

Kell, et al., "An MDD Approach to Multidimensional Bin Packing", Proceedings of the 10th International Conference on the Integration of AI and OR Techniques in Constraint Programming for Combinatorial Optimization Problems, 2013, 16 pages (pp. 1-16 in pdf), Carnegie Mellon University, US.

Korf, "A New Algorithm for Optimal Bin Packing", Proceedings of the 18th National Conference on Artificial Intelligence (AAAI 2002), 2002, pp. 731-736, US.

Shaw, "A Constraint for Bin Packing", Proceedings of the 10th International Conference on Principles and Practice of Constraint Programming (CP 2004), 2004, pp. 648-662, Springer-Verlag Berlin Heidelberg, France.

Castineiras, et al., "Weibull-based Benchmarks for Bin Packing", Proceedings of the 18th International Conference on Principles and Practice of Constraint Programming (CP 2012), 2012, pp. 207-222, Springer-Verlag Berlin Heidelberg.

Kou, et al., "Multidimensional Bin Packing Algorithms", IBM Journal of Research and Development 21(5), Sep. 1977, pp. 443-448, US.

Lodi, et al., "Two-dimensional packing problems: A survey", European Journal of Operational Research 141(2), 2002, pp. 241-252, Elsevier Science B.V.

Lodi, et al., "Heuristic algorithms for the three-dimensional bin packing problem", European Journal of Operational Research 141(2), 2002, pp. 410-420, Elsevier Science B.V.

Chekuri, et al., "On Multi-dimensional Packing Problems", SIAM Journal on Computing, vol. 33, Issue 4, 2004, pp. 1-21, US.

Martello, et al., "Lower Bounds and Reduction Procedures for the Bin Packing Problem", Discrete Applied Mathematics 28, 1990, pp. 59-70, Elsevier Science Publishers B.V., North Holland.

Hoda, et al., "A Systematic Approach to MDD-Based Constraint Programming", Proceedings of the 16th International Conference on Principles and Practice of Constraint Programming (CP 2010), 2010, pp. 266-280, Springer-Verlag Berlin Heidelberg, Carnegie Mellon University, US.

Bergman, et al., "Manipulating MDD Relaxations for Combinatorial Optimization", Proceedings of the 8th International Conference on the Integration of AI and OR Techniques in Constraint Programming for Combinatorial Optimization Problems (CPAIOR 2011), 2011, pp. 20-35, Springer-Verlag Berlin Heidelberg, Carnegie Mellon University, US.

Gent, et al., "From Approximate to Optimal Solutions: Constructing Pruning and Propagation Rules", Proceedings of the 15th International Joint Conference on Artificial Intelligence (IJCAI 1997), 1997, pp. 1396-1401, Scotland.

Korf, "An Improved Algorithm for Optimal Bin Packing", Proceedings of the 18th International Joint Conference on Artificial Intelligence (IJCAI 2003), 2003, pp. 1252-1258, US.

Kitching, et al., "Set Branching in Constraint Optimization", Proceedings of the 21st International Joint Conference on Artificial Intelligence (IJCAI 2009), 2009, pp. 532-537, Canada.

Dechter, et al., "Temporal constraint networks", Artificial Intelligence 49, 1991, pp. 61-95, Elsevier Science Publishers B.V., US.

Heinz, et al., "Solving steel mill slab design problems", ZIB-Report 11-38, Sep. 2011, 20 pages (pp. 1-20 in pdf), Konrad-Zuse-Zentrum für Informationstechnik, Berlin, Germany.

Gargani, et al., "An Efficient Model and Strategy for the Steel Mill Slab Design Problem", Springer-Verlag Berlin Heidelberg (CP 2007), 2007, pp. 77-89, France.

Bansal, et al., "Improved approximation algorithms for multidimensional bin packing problems", Proceedings of the 47th Annual IEEE Symposium on Foundations of Computer Science (FOCS'06), Oct. 2006, 10 pages (pp. 1-10 in pdf), US.

Fukunaga, et al., "Bin-Completion Algorithms for Multicontainer Packing and Covering Problems", Journal of Artificial Intelligence Research, 2007, 8 pages (pp. 1-8 in pdf), vol. 28, AI Access Foundation, El Segundo, CA, US.

Korf, "Multi-Way Number Partitioning", 21st International Joint Conference on Artificial Intelligence (IJCAI-09), Jul. 2009, pp. 538-543, Pasadena, CA, US.

Cazenave, "Nested Monte-Carlo Search", Proceedings of the 21st International Joint Conference on Artificial Intelligence (IJCAI-09), Jul. 2009, pp. 456-461, Pasadena, CA, US.

Korf, "A Hybrid Recursive Multi-Way Number Partitioning Algorithm", Proceedings of the 22nd International Joint Conference on Artificial Intelligence, 2011, pp. 591-596, AAAI Press, US.

\* cited by examiner

MULTI-DIMENSIONAL COMPUTING AND COMMUNICATION RESOURCE ALLOCATION USING BIN-PACKING WITH PER-BRANCH COMBINATION TRIES

BACKGROUND OF THE INVENTION

1. Field of the Invention

The present invention is related to processing systems and networks, and more specifically to techniques for allocating resources in such systems using a multi-dimensional bin-packing algorithm that tries combinations of remaining resources at each branch.

2. Description of Related Art

In networked and distributed computing systems, as well as other multi-threaded, multi-tasking or multiple-customer computing systems, resources may vary between individual nodes and devices both by type and amount. Systems management software typically manages allocation of such resources, in order to meet the requirement of executing all of the tasks required of the system within resource constraints of the system, or to minimize power consumption of the system by placing some of the resources in a low-power operating state.

A class of algorithms known as bin-packing algorithms can be used to determine efficient assignment of resources as between tasks and "bins", which correspond to local resources that can be used to execute a task, e.g., those resources available in a computing node or group. Of particular interest are multi-dimensional bin-packing algorithms, since the mapping of resources to tasks is not a one-dimensional problem, since memory requirements, computing throughput, I/O capability, processor architecture types, and other considerations for executing tasks may be orthogonal requirements.

While multi-dimensional bin-packing algorithms exist that can solve such problems, it is desirable to provide a computing system and a computer program product for allocating systems resources that can efficiently perform such allocation without undue waste of the systems resources.

BRIEF SUMMARY OF THE INVENTION

The invention is embodied in a computer system, and computer program that manage allocation of resources in the computer system using a multi-dimensional bin-packing algorithm. The computer program is a program for managing the allocation of resources that is executing within the computer system.

The resource allocation program first determines resource requirement vectors corresponding to a plurality of resource consumers, e.g. applications or customer operating systems images, etc. The resource requirements vectors contain values specifying resource amounts for multiple types of required resources for the corresponding resource consumer. The multi-dimensional bin-packing algorithm assigns the resource consumers to corresponding ones of groups of computing or communication resources by recursively exploring partial solutions for assigning the resource consumers to individual ones of the groups of computing or communication resources in order to satisfy the resource requirement vectors for the plurality of resource consumers. The recursion extends the partial solutions until the requirements in the resource requirement vectors are met by assignment of the corresponding resource consumers to groups having sufficient resources of the multiple types to meet the resource amounts specified in the resource requirement vectors. The bin-packing algorithm tests resource requirements vectors for remaining unassigned ones of the resource consumers for both assignment and non-assignment to a current individual group of computing or communications resources in a current partial solution until the current partial solution becomes a complete solution that satisfies the requirement vectors for the plurality of resource consumers.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to computer programs and computer systems that allocate computing or communications resources to resource consumers. A recursive bin-packing algorithm provides efficient assignment of resource consumers to groups of computing or communications resources by handling multiple resource types as multiple dimensions of the bin-packing problem and determining requirements vectors specifying requirements for each of the resource consumers in the multiple dimensions. The bin-packing algorithm recursively explores partial solutions that assign consumers to the groups by extending the partial solutions via recursion until the requirements in the resource requirement vectors are met. The bin-packing algorithm tests resource requirements for remaining unassigned ones of the resource consumers for both assignment and non-assignment to a current individual group of computing or communications resources in a current partial solution until the current partial solution becomes a complete solution that satisfies the requirement vectors for the plurality of resource consumers.

The problem of allocating computing or communications resources, such as processing system sub-units or networking communications hardware can be viewed as a multi-dimensional bin-packing problem. Since the requirements for performing a given task in such systems are generally multi-dimensional, fitting the tasks to the available resources can be modeled as filling physical multi-dimensional bins with items having multi-dimensional properties, where the resources of given groups of computing or communications resources are modeled as the bins, and the tasks are modeled as the items. Both the bins and the tasks have fixed dimensions, so the problem is a combinatorial problem of fitting the tasks within the bins. The resources are similarly fixed for the groups of computing or communications resources to which tasks are being allocated, and the tasks are assumed to have fixed resource requirements, which are generally the maximum resource requirements for the tasks. Examples of such resources are given below in Table I, in which the rows correspond to type of resources (corresponding to dimensions) that might be present in a group of computing/communication resources (correspond to bins), but the possible resources or dimensions are not limited to those that are shown. Tasks having requirements for certain resources, e.g., a program that needs 2 cores and a memory space of 3 Gb in order to execute, correspond to the items that are placed in the bins.

TABLE I

| Type | Resource dimension 1 | Resource dimension 2 | Resource dimension 3 | Resource dimension 4 |
|---|---|---|---|---|
| Processing unit | # cores | MIPS | memory size | FPU presence |
| Storage | Format | size | I/O speed | persistence |
| Network link | I/O speed | # hops | protocol | # protocol changes |

Existing solutions to the bin-packing problem in multiple dimensions are either brute-force combinatorial trial-and-error approaches, or more sophisticated algorithms such as heuristic-driven Constraint satisfaction problem (CSP) based search algorithms. In order to understand and implement the bin-packing techniques disclosed herein, a mathematical construct of the problem can be used, which specifies a set of n item sizes $(s_1, \ldots, s_n)$ and a set of m bin capacities $(c_1, \ldots, c_m)$. Each item size $s_i$ is a d-tuple of nonnegative integers $(s_{i,1}, \ldots, s_{i,d})$, and likewise for each bin capacity $c_j = (c_{j,1}, \ldots, c_{j,d})$. The objective of the algorithm is to produce an assignment S such that each of the n items is assigned to exactly one of the m bins without exceeding the capacity of any bin/dimension pair:

$$\sum_{S(i)=j} s_{i,k} \leq c_{j,k} \; \forall \; j \in [1, m], k \in [1, d]$$

Since a complete set of bins is specified in advance, the above formulation is a strict decision problem, as opposed to the optimization variant that is more commonly studied in bin-packing literature.

Figure 1:
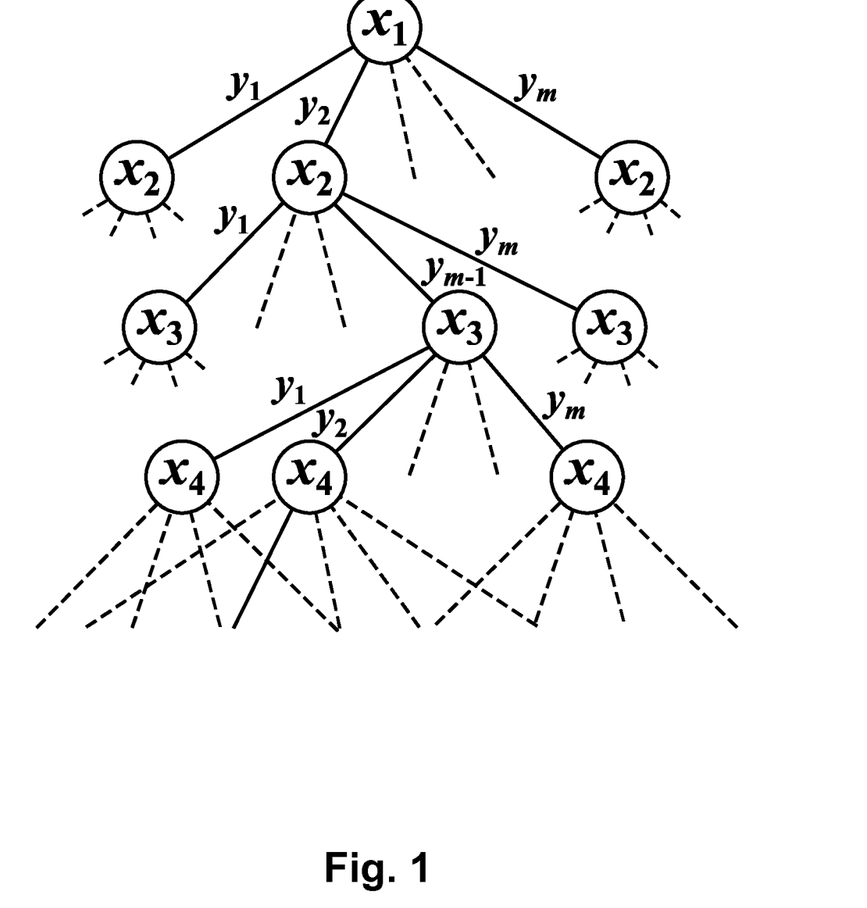
FIG. 1 is a diagram depicting a typical constraint satisfaction problem solution search.

Recent development in multidimensional bin-packing algorithms transform multidimensional bin-packing into a CSP in which where a variable $x_i$ is created for each item for which a domain $D_i = \{y_1, \ldots, y_m\}$ corresponds to the set of available bins. The CSP has m×d constraints over the subsets that compose each bin. As a definition, a partial assignment P in the CSP formulation of multidimensional bin-packing is a mapping $(x_1, \ldots, x_p) \rightarrow (y_{P(1)}, \ldots, y_{P(p)})$ of a subset of items to their respective bins such that $\sum_{P(x_1)=y_j} s_{i,k} \leq c_{j,k}$ for all $j \in [1,m]$ and $k \in [1,d]$. A complete assignment is any P where $|P|=n$. CSPs are traditionally solved in a depth-first search manner, as illustrated in the diagram of FIG. 1, in which variables are selected sequentially and each value leads to a separate branch of search. The search state is encoded implicitly in the call stack, with each recursive call forming a node along a partial path. For the CSP formulation of multidimensional bin-packing, a different approach has been taken, in which the various combinations of item-bin assignments are stored explicitly in a so-called multi-valued decision diagram (MDD). In a CSP with n variables, the MDD has n+1 layers that may be denoted $L_1, \ldots, L_{n+1}$. Each layer contains a set of nodes, and each edge connects nodes in adjacent layers $L_i$ and $L_{i+1}$ reflecting an assignment to the variable $x_i$. The final layer $L_{n+1}$ has a single node (referred to as "the sink") representing a complete solution result. Any path in the MDD from root to sink corresponds to a solution to the CSP. The values of the solution are specified by the labels of the connections along the path. Partial paths correspond to partial solutions that may or may not extend to complete solutions.

Figure 2A:
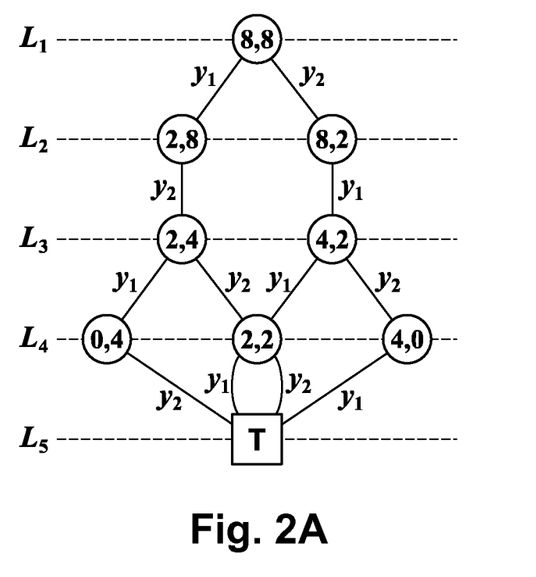
FIGS. 2A-2B are multi-valued decision diagrams depicting direct and ullage solution searches.
Figure 2B:
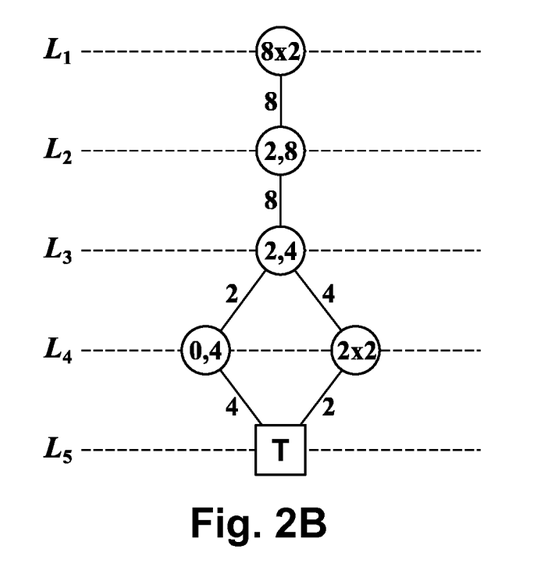

In a direct MDD representation, as exemplified in FIG. 2A, the nodes in each layer are labeled with states that map each bin to its remaining multidimensional capacities (referred to as the "ullage" vector). Connections are labeled with the index of the bin $y_j$ corresponding to the corresponding assignment for $x_i$. The ullage vectors of two nodes u and v at respective layers $L_i$ and $L_{i+1}$ that are joined by a connection $y_j$ differ only at position j (i.e., $v_j = u_j - s_i$). If two nodes at the same layer were to share identical ullage vectors across all bins, the set of feasible completions beneath the two nodes would be identical. To prevent the construction and expansion of duplicate structures, the MDD stores only one copy of each node at a layer, effectively merging the paths of isomorphic partial assignments. The merging not only reduces the MDD's overall size, but also reduces the effort required to find a complete path from root to sink. In FIG. 2A, node (2, 2) at layer $L_4$ reflects a merger of two partial assignments: the extension of (2, 4) at layer $L_3$ with $x_3 \leftarrow y_2$, and the extension of (4, 2) at layer $L_3$ with $x_3 \leftarrow y_1$. FIG. 2B illustrates an alternative ullage solution search that collapses nodes with identical ullage multiplicities.

Figure 3:
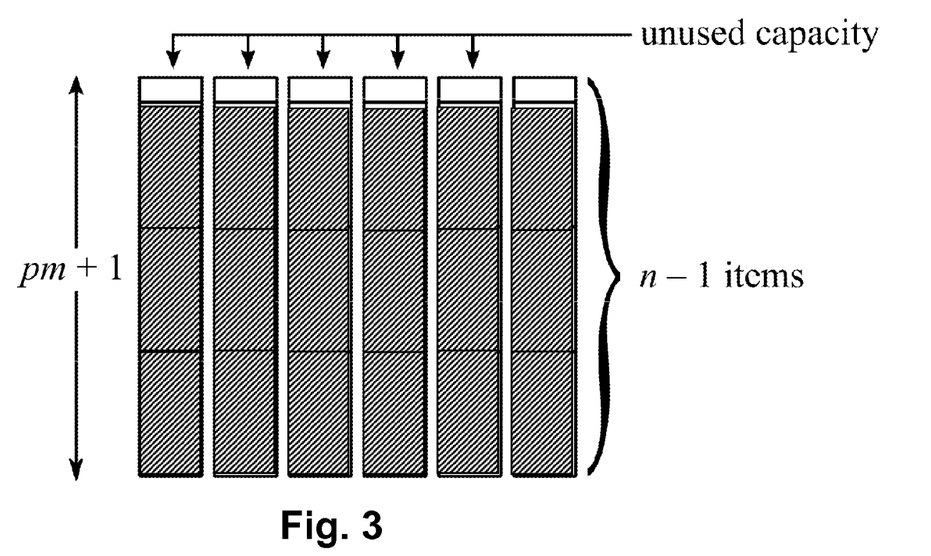
FIG. 3 is a bin diagram illustrating a bin-packing problem as can be solved by embodiments of the present invention.

A fundamental challenge that arises in any practical implementation of multidimensional bin-packing is the computation of strong lower bounds, i.e., estimating the minimum number of additional bins ultimately needed to extend a partial assignment. Even in a decision variant of the problem where precisely m bins are available, such bounding is critical in determining wasted space and pruning nodes for which any complete extension is incapable of remaining within the available resource envelope. For example, consider a d-dimensional bin-packing instance having m bins and $n=pm+2$ items for some $p \geq 1$. For all $1 \leq i \leq n-2$ and $1 \leq k \leq d$, $s_{i,k}$ is set to m. For the final two items ($s_{n-1}$ and $s_n$), the sizes across all dimensions are set to m−1 and 1 respectively. Bin capacities $c_{j,k}$ are set to pm+1 for all $1 \leq j \leq m$ and $1 \leq k \leq d$. By construction, the combined capacity for the above example appears sufficient to accommodate all items. For any dimension k, the quantity $\sum_j c_{j,k}$ is equal to $m(pm+1)=pm^2+m$, which is equivalent to the combined demand across all pm+2 items. However, each bin can accommodate at most p items of size m if m>1, requiring at least one unit of empty space in all but a single bin. The above example is clearly contrived to be infeasible. FIG. 3 illustrates a case in which m=6 and p=3. In any partial assignment, only 19 of the 20 items can be packed into the bins without overflow.

In a conventional approach to a multi-dimensional CSP using direct combinatorial search, that is, an approach in which branching takes place on the assignment of individual items, effective lower bounds can be difficult to compute. Only at leaf nodes in the search are all items bound to individual bins. Until all items are assigned to bins, the provable amount of wasted space for any single bin is typically unknown. In the examples given above, the number of partial assignments that successfully place all but the last two items is:

$$\binom{pm}{p} \times \binom{p(m-1)}{p} \times \binom{p(m-2)}{p} \times \ldots \times 1$$

To address pathological cases such as the above example, slightly improved inference rules can be adopted, but the modified rules typically depend heavily on structural properties of the instance. For example, if it were not for a unit-sized item $s_n$ in the example, modulo arithmetic could quickly detect that the maximum capacity utilized by any bin is at most pm.

To overcome the above-mentioned constraints, in the instant disclosure, a different approach is taken to solving the multidimensional bin-packing CSP. In contrast to traditional approaches that branch on the assignment of individual items, the technique disclosed herein instantiates the contents of bins sequentially and independently based on the concept of set branching in a meta-CSP. The exemplary algorithm remains depth-first, but adopts a least commitment strategy for individual items when the exclusion of the item from a bin is considered. The use of MDDs can be abandoned in favor of using aggregate capacity over incomplete bins to establish bounds on the solution quality of a partial assignment. The exemplary model exploits a type of set branching modeling in a meta-CSP, in which the variables correspond to bin contents, and the values correspond to complete subsets of items. As a definition, a partial assignment P in the meta-CSP formulation of multidimensional bin-packing is a list of item subsets $(S_1, \ldots, S_p)$ such that $\Sigma_{Xi \in S(j)} s_{i,k} \leq c_{j,k}$ for all $j \in [1,p]$ and $k \in [1,d]$, and $P_j \cap P_{j'} = \emptyset$ for any $j \neq j'$. A complete assignment is any such P where $|P|=m$ and $\cup P_j = \{x_1, \ldots, x_n\}$. In contrast to the original CSPs described above, in which the complete contents of each bin are subject to change for each of the branches, the meta-CSP commits to specific complete subsets of item assignments as each branch is explored.

In a multidimensional bin-packing problem with n items, the number of potential subsets of items to assign to any bin is $2^n$. It may be possible to explicitly enumerate all such subsets in advance if n is relatively small, but such an exhaustive process is clearly intractable for significantly large n. Furthermore, most possible subsets will not be feasible candidates for a given subset $S_j$, due either to the bounds imposed by the multidimensional capacity constraints $c_{j,k}$ or by the inclusion of items in previously instantiated subsets $S_1$ to $S_{j-1}$. Therefore, in the instant example potential values are dynamically generated by nested recursion. As the bin-packing problem search descends to compute alternative branches for the next meta-variable $S_j$, a list of as-yet unassigned items U is passed from the parent node. All partial combinations of items in U are tested for feasibility by incrementally subtracting the demand of each item from an available capacity vector that begins at $\{c_{j,1}, \ldots, c_{j,d}\}$. Subsets are pruned whenever the capacity along any dimension becomes negative, ensuring that only a fraction of the full $2^{|U|}$ subsets is considered. By comparison, the order in which partial assignments are expanded in the exemplary meta-CSP and a typical CSP solution differs significantly. In a typical CSP solution, once an item $x_i$ is excluded from subset $S_j$, the item is immediately committed to inclusion in some other specific subset $S_{j'}$. In contrast, the meta-CSP or the exemplary embodiment effectively defers the ultimate assignment of $x_i$, taking a least commitment approach and instead selects some replacement $x_{i'}$ for inclusion in $S_j$. As will be shown below, the least-commitment strategy allows substantial inference to be performed on partial assignments.

Figure 4:
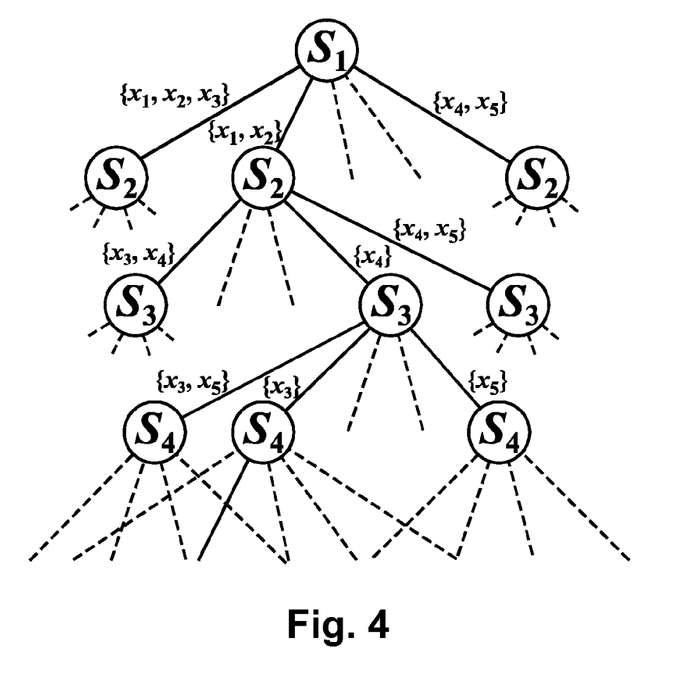
FIG. 4 is a diagram depicting a constraint satisfaction problem solution search as performed by techniques according to an embodiment of the invention.

The nodes explored by searching the meta-CSP described above are shown in FIG. 4 and roughly correspond to the same nodes explored by those expanded in the CSP formulation illustrated in FIG. 1 (albeit in a different order). In both solutions, combinations of items to bins are considered exhaustively with basic pruning rules serving to prohibit bin overflow along any partial path. However, each partial assignment $P=(S_1, \ldots, S_p)$ in the meta-CSP of FIG. 4 corresponds to a set of complete subsets, since the exemplary meta-CSP search procedure is prohibited from retroactively inserting items into previously assigned bins. The exemplary meta-CSP requires that all remaining items must be distributed across only the remaining (un-instantiated) meta-variables $\{S_{p+1}, \ldots, S_m\}$. The above rule can be leveraged to strengthen the inference performed at intermediate nodes of the solution. The observation can be expressed as a theorem. Consider a partial assignment $P=(S_1, \ldots, S_p)$ that leaves $U=\{x_1, \ldots, x_n\}-\cup P_j$ items unassigned. For any complete assignment P' that descends from P, it must be the case that $\Sigma_{x_i \in U} s_{i,k} \leq \Sigma_{j \in [p+1,m]} C_{j,k}$ for all $k \in [1,d]$. The proof of the above-stated theorem is straightforward. If there exists any dimension for which the total amount of remaining demand exceeds the total amount of remaining capacity, no feasible assignment of items to bins can be achieved that is capable of respecting all capacity constraints. The above rule can be used as the basis for a stronger pruning criterion that aggregates capacities of un-instantiated bins.

By pruning intermediate nodes that violate capacity constraints for any bin, the exemplary bin-packing algorithm avoids pursuing partial solution in which bin contents are strictly oversubscribed. However, the potential still remains for a bin to be assigned too few elements, causing a waste of available resources. For example, in the trace shown in FIG. 4, after the assignment $S_1 \leftarrow \{x_1, x_2, x_3\}$, a (weaker) assignment $S_1 \leftarrow \{x_1, x_2\}$ is subsequently attempted. The latter partial assignment is clearly dominated by the former. While such a partial solution it may indeed lead to a feasible complete solution. Any such complete solution would have been found by exploring extensions to the assignment for which $S_1$ also included $x_3$. Thus, the exemplary meta-CSP algorithm avoids expanding any search node for which there exists a bin with sufficient capacity to accommodate items for which assignment has been deferred. The exemplary meta-CSP algorithm allows symmetry to be exploited by forcing one specific unassigned item into a bin currently under consideration. For example, at the topmost level in search in FIG. 4, the inclusion of item $x_1$ in $S_1$ can be imposed upon all partial assignments, pruning cases such as $S_1 \leftarrow \{x_4, x_5\}$ for which all extensions are isomorphic to assignments previously considered in the search.

In an example pseudo-code listing, the complete exemplary bin-packing algorithm is presented. The recursive function Solve(j, U, $S_j$, $!S_j$) provides the solution and accepts j as the index of the bin whose contents are being considered, U as the remaining items to assign, $S_j$ as the set of items to be included in bin j, and $!S_j$ as the set of items to be excluded from bin j. The pseudo-code example returns UNSAT for an incomplete (unsatisfied) solution, and SAT for a complete solution that satisfies the bin-packing problem.

```
Solve (j, U, S_j, |S_j|)
begin
  // check S_j for assigned item having a dimension too large for the current bin
  for all items i in S_j:
    if there is a k for which s_{i,k} > c_{j,k} then return UNSAT
  // search |S_j| for item that is too large in a dimension for any remaining bin
  for all items i in |S_j|:
    for all j' > j:
      if there is a k for which s_{i,k} > c_{j',k} then return UNSAT
  // If there are no items left to assign
  if U = Ø then
    // if all items have been assigned - success!
    if j = m then return SAT
    // otherwise check this partial solution to see if a dominant solution has been
    // found previously
    for each item i in |S_j|
      if there is an i' for which s_{i',k} ≤ c_{j,k} with item i included in S_j then return
        UNSAT
    // recurse to finish current partial solution
    return Solve (j+1, |S_j|, Ø, Ø)
  // otherwise select a remaining item
  i ← Select(U)
  // explore solution branch for inclusion of this item
  if Solve (j, U − {i}, S_j ∪ {i}, |S_j|) then return SAT
  // check if the current partial solution exists at all
  if Sj != Ø
    // explore solution branch for exclusion of this item
    if Solve (j, U − {i}, S_j, |S_j| ∪ {i}) then return SAT
  return UNSAT
end
```

Figure 5:
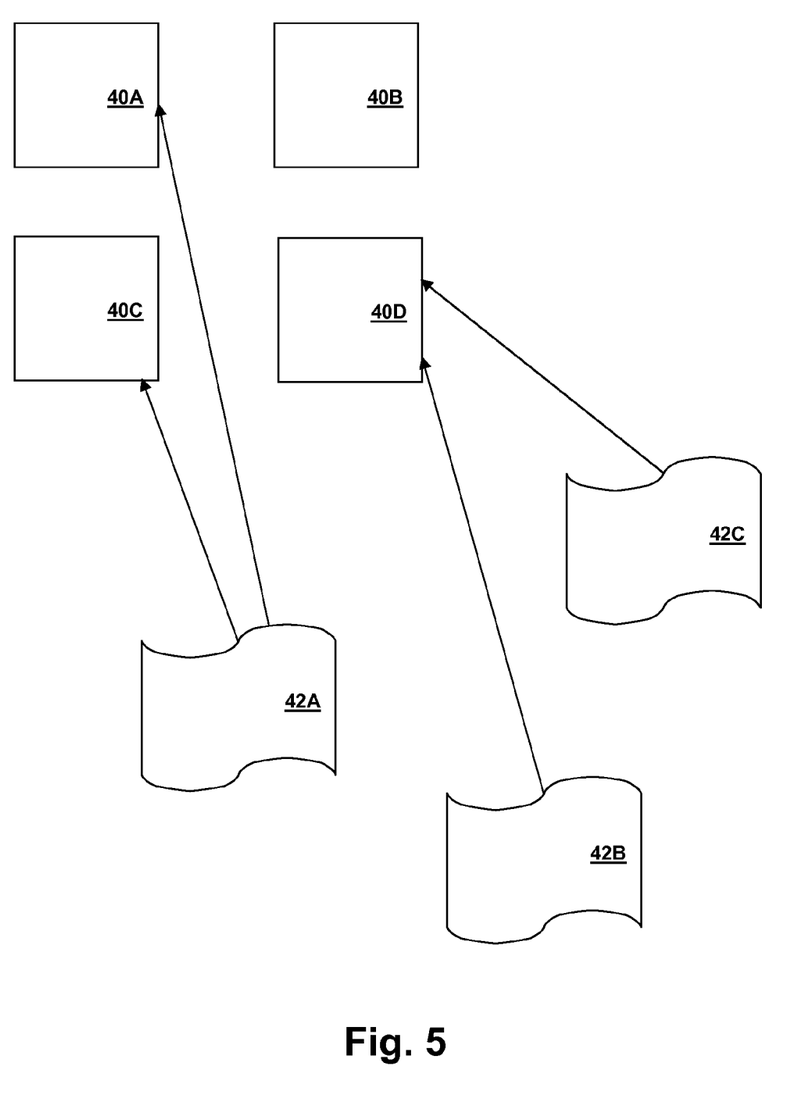
FIG. 5 is a diagram depicting allocation of resources that may be performed by embodiments of the present invention.

The above algorithm is applied to the assignment of computing or communications resources, as illustrated in FIG. 5. A plurality of tasks 42A-42C is shown, which may be, for example application (client) computer programs or virtual machines to be executed within a computing cloud, server or multi-processing system, or alternatively communications requiring delivery to endpoints. Tasks 42A-42C are allocated to the groups of computing or communications resources 40A-40D, which may be, for example processing groups, servers, network communications devices, etc. Resource requirements vectors are generated for each of the tasks 42A-42C, which serve as item sizes ($s_1, \ldots, s_n$) in the above algorithm and a set of m bin capacities ($c_1, \ldots, c_m$) are generated from the resources available in each of the groups of computing or communications resources 40A-40D.

Figure 6:
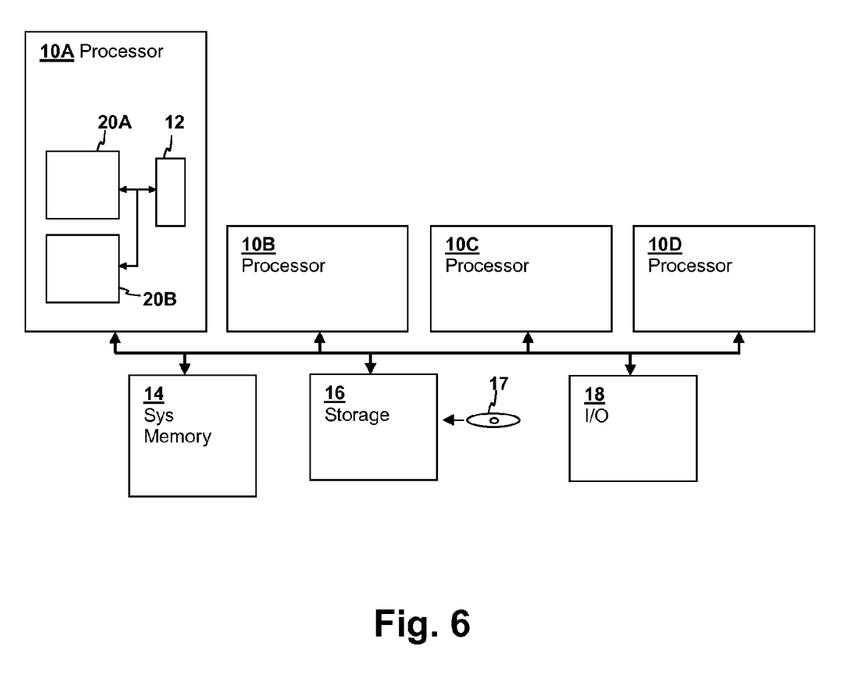
FIG. 6 is a block diagram of a computer system in which methods in accordance with embodiments of the present invention can be implemented by program instructions.

Referring now to FIG. 6, a processing system is shown in which program instructions implementing the above algorithm in accordance with an embodiment of the present invention are executed, and which may also serve as an example of one of the groups of computing or communications resources 40A-40D in the form of a multi-processing system with certain available resources. The exemplary processing system includes a number of processors 10A-10D. The depicted multi-processing system is illustrative, and a processing system in accordance with other embodiments of the present invention include uni-processor systems or any device capable of executing the above algorithm and the controlling the allocation of the tasks 42A-42C to the groups of computing or communications resources 40A-40D. Processors 10A-10D are identical in structure and include cores 20A-20B and a local storage 12, which may be a cache level, or a level of internal system memory. Processors 10A-10D are coupled to main system memory 14, a storage subsystem 16, which includes non-removable drives and optical drives, for reading media such as a CD-ROM 17 forming a computer program product and containing program instructions implementing a resource manager for execution by processors 10A-10D, and also containing executable programs that implement applications and services executing within the computer system. The illustrated processing system also includes input/output (I/O) interfaces and devices 18 such as mice and keyboards for receiving user input and graphical displays for displaying information. While the system of FIG. 6 is used to provide an illustration of a system in which the processor architecture of the present invention is implemented, it is understood that the depicted architecture is not limiting and is intended to provide an example of a suitable computer system in which the techniques of the present invention are applied.

Figure 7:
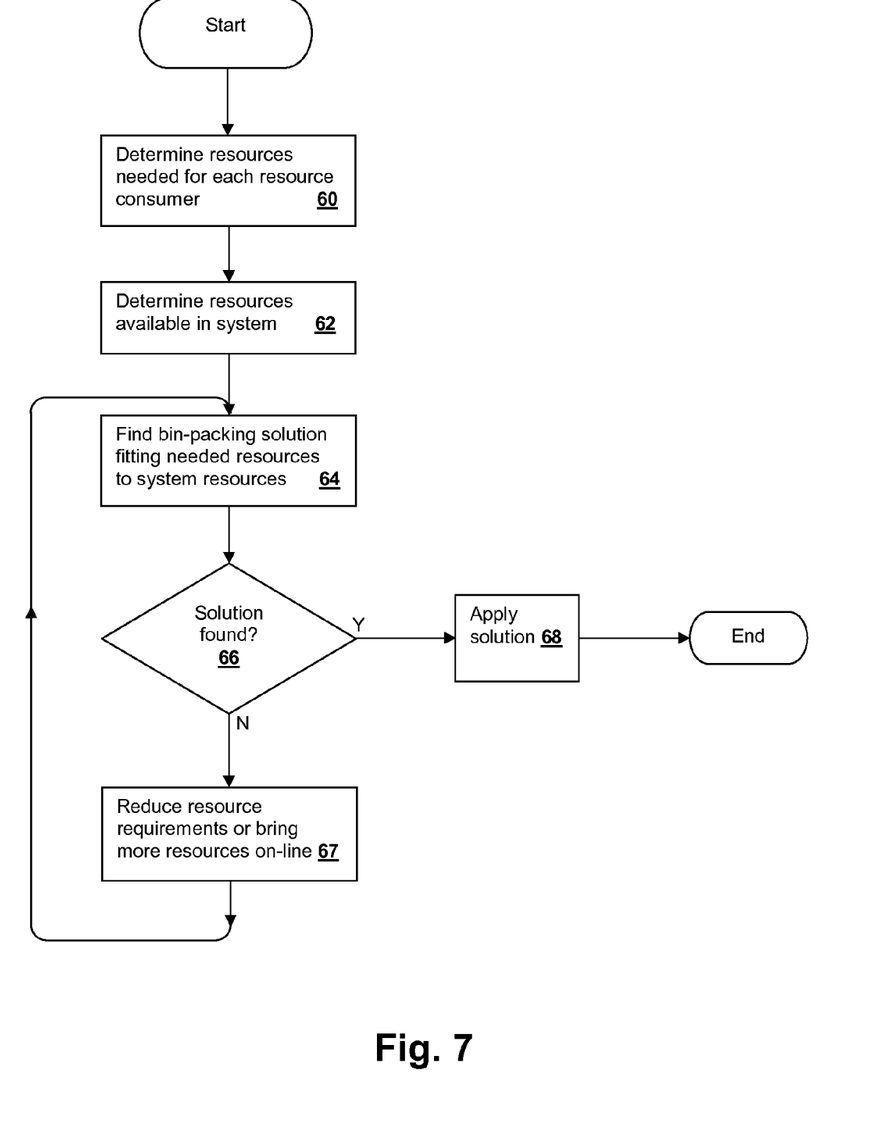
FIG. 7 is a flowchart depicting a method of resource allocation in accordance with an embodiment of the present invention.

Referring now to FIG. 7, a resource allocation method in accordance with an embodiment of the invention is illustrated. The resources needed for each consumer (task) is determined (step 60) and the resources available in the overall system are also determined (step 62). A bin-packing solution fitting the needed resources to the system resources is searched (step 64) and if a solution is found (decision 66), the solution is applied (step 68). Otherwise, the resource requirements for the tasks or the set of tasks is reduced or other resources are brought on-line (step 67) and the steps from 64-67 are repeated.

Figure 8A:
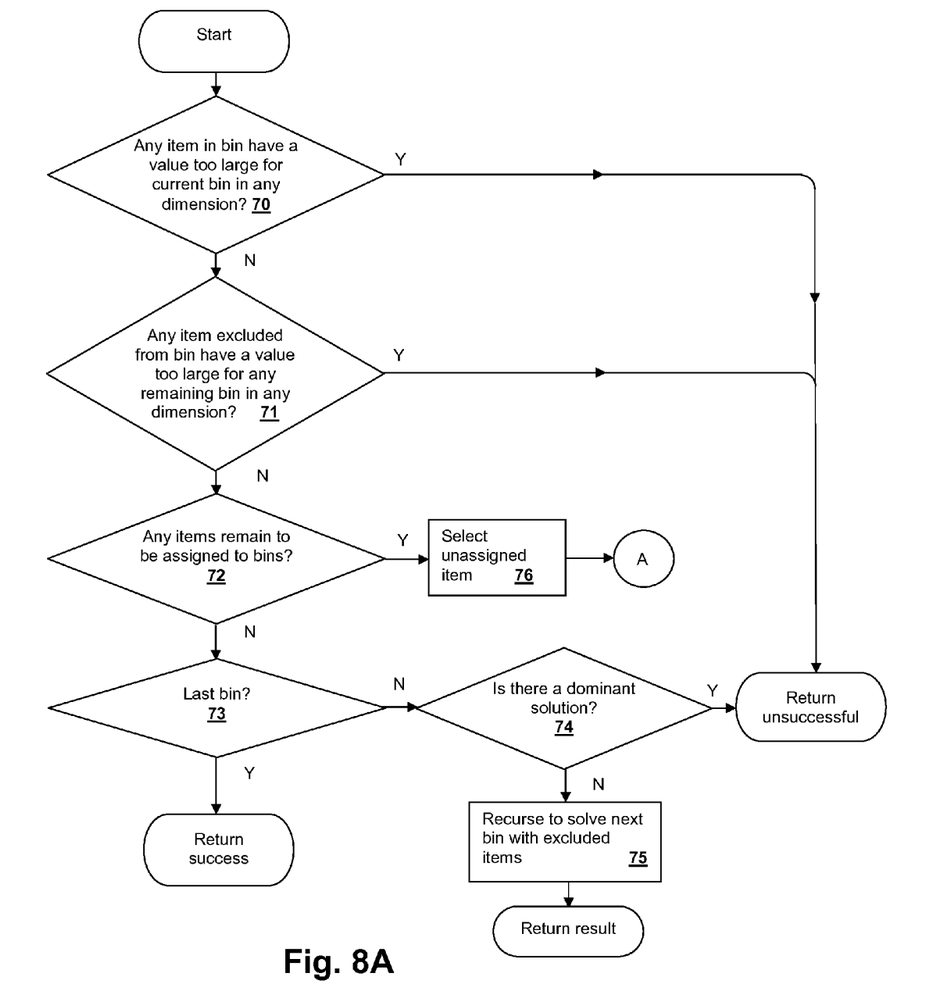
FIG. 8A-8B form a flowchart depicting a method of solving the bin-packing algorithm as may be implemented in the method depicted in FIG. 7.
Figure 8B:
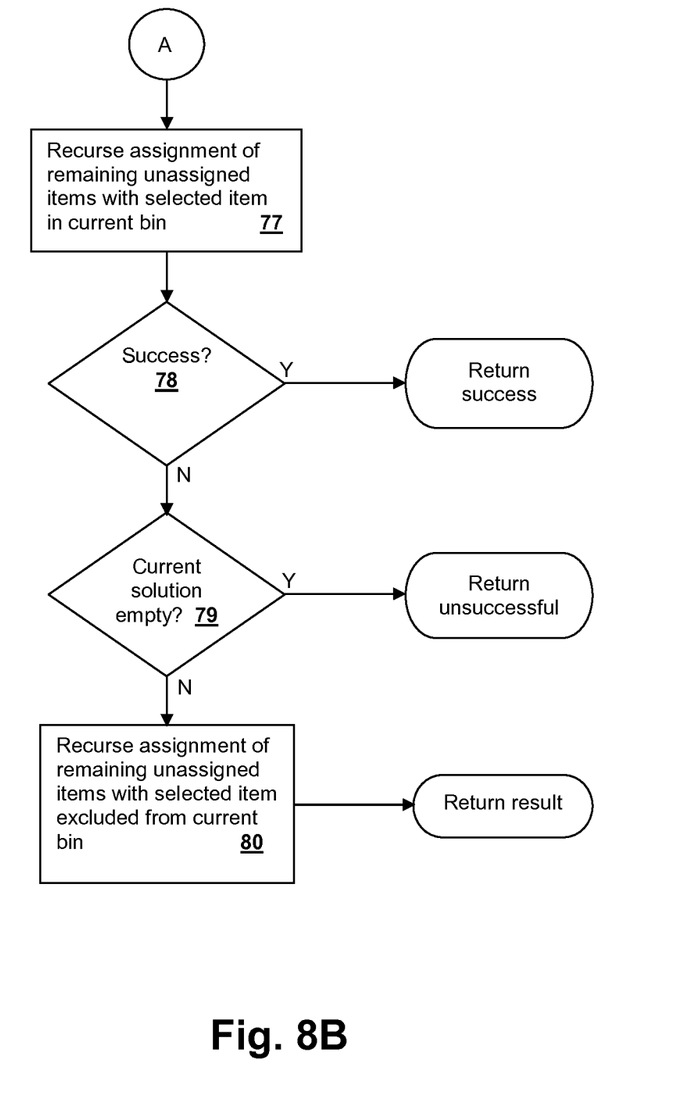

Referring now to FIGS. 8A-8B, the above-described bin-packing algorithm is shown in a flowchart. First, for the current partial solution $S_j$, if an item in the current bin has a value too large for the bin in any dimension (decision 70), the bin-packing algorithm returns unsuccessfully. Next if any item is excluded from the current bin that has a value too large for any remaining bin in any dimension (decision 71), the bin-packing algorithm returns unsuccessfully. If no items remain to be assigned to the bins (decision 72) and the last bin has been reached (decision 73), then the algorithm returns successfully. Otherwise if the last bin has not been reached (decision 73), the current partial solution is checked for a dominant solution (decision 74). If there is a dominant solution, the bin-packing algorithm returns unsuccessfully. Otherwise, the algorithm is called recursively to solve the next bin with the set of items excluded from the current partial solution (step 75). If items remain to be assigned to the bins (decision 72), an unassigned item is selected (step 76) and the bin-packing algorithm is called recursively to assign remaining unassigned items with the selected item in the current bin (step 77). If the recursion succeeds (decision 78) the bin-packing algorithm returns successfully. Otherwise, if the recursion fails (decision 78), and if the current partial solution is empty (decision 79), the bin-packing algorithm returns unsuccessfully. Otherwise, if the current partial solution is non-empty (decision 79), the bin-packing algorithm is called recursively to assign remaining unassigned items with the selected item excluded from the current bin (step 80).

Figure 9:
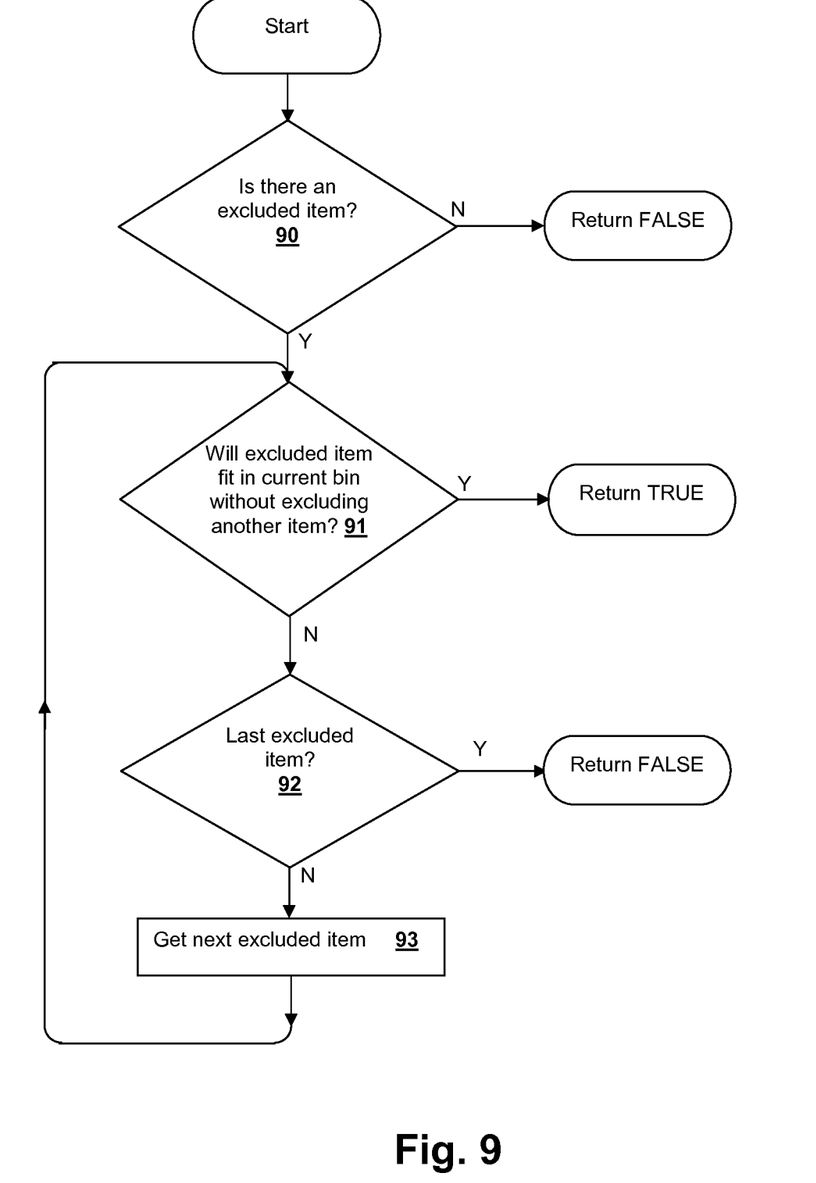
FIG. 9 is a flowchart depicting a method of pruning solutions as may be employed in the method depicted in FIG. 7.

Referring now to FIG. 9, details of the dominant solution check in decision 74 of FIG. 8A is shown. First, the current partial solution is checked to determine if there is an excluded item (decision 90). If there is not an excluded item (decision 90), the dominant solution check returns false. If there is an excluded item (decision 90), a check is performed to determine if the excluded item can be included in the current bin without excluding another item (decision 91). Until the last excluded item has been processed (decision 92), the algorithm performs steps 91-92 with the next excluded item (step 93).

As noted above, portions of the present invention may be embodied in a computer program product, which may include firmware, an image in system memory or another memory/cache, or stored on a fixed or re-writable media such as an optical disc having computer-readable code stored thereon.

Any combination of one or more computer readable medium(s) may store a program in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer system comprising a processor for executing program instructions coupled to a memory for storing the program instructions, wherein the program instructions are program instructions for assigning a plurality of resource consumers to groups of computing or communications resources, and wherein the program instructions comprise:

program instructions for first determining resource requirement vectors corresponding to the plurality of resource consumers, wherein the resource vectors contain values specifying resource amounts for multiple types of required resources for the corresponding resource consumer; and program instructions for assigning the resource consumers to corresponding ones of the groups of computing or communication resources by executing program instructions implementing a bin-packing algorithm that recursively explores partial solutions for assigning the resource consumers to individual ones of the groups of computing or communication resources in order to satisfy the resource requirement vectors for the plurality of resource consumers, wherein the bin-packing algorithm extends the partial solutions via nested recursion that descends via repetitive invocations of the bin-packing algorithm from within the bin-packing algorithm, wherein the nested recursion descends until the requirements in the resource requirement vectors are met by assignment of individual groups of the resources that are sufficient to satisfy the resource amounts for the multiple types specified in a corresponding resource requirement vector, wherein the bin-packing algorithm tests resource requirements vectors for remaining unassigned ones of the resource consumers for both assignment and non-assignment to a current individual group of computing or communications resources in a current partial solution until the current partial solution becomes a complete solution that satisfies the requirement vectors for the plurality of resource consumers.

2. The computer system of claim 1, wherein the program instructions that implementing the bin-packing algorithm comprise:

program instructions for detecting that the current partial solution is covered by a dominant solution previously explored; and program instructions for, in response to detecting that the current partial solution is covered by a dominant solution previously explored, terminating the recursion of the current partial solution.

3. The computer system of claim 2, wherein the program instructions for detecting comprise program instructions for second determining that a resource requirement vector for an excluded resource consumer can be satisfied by assignment to the current individual group without excluding another resource consumer assigned to the current partial solution.

4. The computer system of claim 1, wherein the program instructions implementing the bin-packing algorithm comprise:

program instructions that, for the current partial solution, second determine if any resource consumers remain to be assigned to the groups;

program instructions for selecting an unassigned resource consumer in response to having determined that resource consumers remain to be assigned to the groups;

program instructions that, with the selected resource consumer assigned to the group corresponding to the current partial solution, first recursively apply the assigning of the resources to assign the remaining resource consumers other than the selected resource consumer;

program instructions for third determining if the recursively applying generated a complete solution assigning the remaining resource consumers;

program instructions that, in response to having determined that the recursively applying did not generate a complete solution, fourth determine if the current group has an assigned resource consumer; and program instructions that, in response to having determined that the current group has an assigned resource consumer and with the selected resource consumer excluded from the group corresponding to the current partial solution, second recursively apply the assigning of the resources to assign the remaining resource consumers other than the selected resource consumer.

5. The computer system of claim 4, wherein the program instructions further comprise:

program instructions that, prior to executing the program instructions that second determine if any resource consumers remain to be assigned to the groups, fifth determine if any resource consumer assigned to the current group has a resource requirement vector that cannot be satisfied by the current group or if any item excluded from assignment to the current group has a resource requirement vector that cannot be satisfied by a remaining one of the groups of computing or communication resources; and program instructions that, responsive to having determined that the resource requirement vector cannot be satisfied by the current group or if any item excluded from assignment to the current group has a resource requirement vector that cannot be satisfied by a remaining one of the groups of computing or communication resources, prevent execution of the program instructions for performing the selecting, the first recursively applying and the second recursively applying.

6. The computer system of claim 1, wherein the communication resources are real or virtual hardware processing, communications or storage resources of a computer system, and wherein the resource consumers are software applications requiring the real or virtual hardware processing, communications or storage resources for execution.

7. The computer system of claim 1, wherein the computing or communication resources are communication resources within a computer network, and wherein the resource consumers are processing nodes requiring communications with other processing nodes.

8. A computer program product comprising a computer-readable storage device that is not a signal or carrier wave storing program instructions for assigning a plurality of resource consumers to groups of computing or communications resources, wherein the program instructions are program instructions for:

first determining resource requirement vectors corresponding to the plurality of resource consumers, wherein the resource vectors contain values specifying resource amounts for multiple types of required resources for the corresponding resource consumer; and assigning the resource consumers to corresponding ones of the groups of computing or communication resources by executing program instructions implementing a bin-packing algorithm that recursively explores partial solutions for assigning the resource consumers to individual ones of the groups of computing or communication resources in order to satisfy the resource requirement vectors for the plurality of resource consumers, wherein the bin-packing algorithm extends the partial solutions via nested recursion that descends via repetitive invocations of the bin-packing algorithm from within the bin-packing algorithm, wherein the nested recursion descends until the requirements in the resource requirement vectors are met by assignment of individual groups of the resources that are sufficient to satisfy the resource amounts for the multiple types specified in a corresponding resource requirement vector, wherein the bin-packing algorithm tests resource requirements vectors for remaining unassigned ones of the resource consumers for both assignment and non-assignment to a current individual group of computing or communications resources in a current partial solution until the current partial solution becomes a complete solution that satisfies the requirement vectors for the plurality of resource consumers.

9. The computer program product of claim 8, wherein the program instructions implementing the bin-packing algorithm comprise program instructions for:

detecting that the partial solution is covered by a dominant solution previously explored; and in response to detecting that the current partial solution is covered by a dominant solution previously explored, terminating the recursion of the partial solution.

10. The computer program product of claim 9, wherein the program instructions for detecting comprise program instructions for second determining that a resource requirement vector for an excluded resource consumer can be satisfied by assignment to the current individual group without excluding another resource consumer assigned to the current partial solution.

11. The computer program product of claim 8, wherein the program instructions implementing the bin-packing algorithm comprise program instructions for:

for the current partial solution, second determining if any resource consumers remain to be assigned to the groups;

responsive to having determined that resource consumers remain to be assigned to the groups, selecting an unassigned resource consumer;

with the selected resource consumer assigned to the group corresponding to the current partial solution, first recursively applying the assigning of the resources to assign the remaining resource consumers other than the selected resource consumer;

third determining if the recursively applying generated a complete solution assigning the remaining resource consumers;

responsive to having determined that the recursively applying did not generate a complete solution, fourth determining if the current group has an assigned resource consumer; and responsive to having determined that the current group has an assigned resource consumer, with the selected resource consumer excluded from the group corresponding to the current partial solution, second recursively applying the assigning of the resources to assign the remaining resource consumers other than the selected resource consumer.

12. The computer program product of claim 11, further comprising program instructions for:

prior to the second determining if any resource consumers remain to be assigned to the groups, fifth determining if any resource consumer assigned to the current group has a resource requirement vector that cannot be satisfied by the current group or if any item excluded from assignment to the current group has a resource requirement vector that cannot be satisfied by a remaining one of the groups of computing or communication resources; and responsive to having determined that the resource requirement vector cannot be satisfied by the current group or if any item excluded from assignment to the current group has a resource requirement vector that cannot be satisfied by a remaining one of the groups of computing or communication resources, not performing the selecting, the first recursively applying and the second recursively applying.

13. The computer program product of claim 8, wherein the computing or communication resources are real or virtual hardware processing, communications or storage resources of a computer system, and wherein the resource consumers are software applications requiring the real or virtual hardware processing, communications or storage resources for execution.

* * * * *